United States Patent [19]

Fukushima et al.

[11] Patent Number: 4,707,075
[45] Date of Patent: Nov. 17, 1987

[54] VERY-LOW-TEMPERATURE FIBERSCOPE

[75] Inventors: Eiji Fukushima; Minoru Tanaka, both of Yokohama; Kazuo Sanada; Sadao Chigira, both of Chiba, all of Japan

[73] Assignees: Kabushiki Kaisha Toshiba, Kawasaki; Fujikura Limited, Tokyo, both of Japan

[21] Appl. No.: 758,402

[22] Filed: Jul. 24, 1985

[30] Foreign Application Priority Data

Jul. 31, 1984 [JP] Japan ............... 57-160582
Aug. 23, 1984 [JP] Japan ............... 59-175417
May 21, 1985 [JP] Japan ............... 60-108721
May 21, 1985 [JP] Japan ............... 60-108723

[51] Int. Cl.$^4$ .................. G02B 5/14; G02B 6/06
[52] U.S. Cl. ..................... 350/96.26; 350/96.10; 350/96.24
[58] Field of Search ............ 350/96.23, 96.24, 96.25, 350/96.26

[56] References Cited

U.S. PATENT DOCUMENTS

| | | | |
|---|---|---|---|
| 3,709,612 | 1/1973 | Clemens | 350/96.24 |
| 3,809,893 | 5/1974 | Dobras | 350/96.24 X |
| 4,209,228 | 6/1980 | Chikama | 350/96.26 |
| 4,341,205 | 7/1982 | Hosono et al. | 350/96.26 X |
| 4,558,691 | 12/1985 | Okada | 350/96.26 X |
| 4,620,769 | 11/1986 | Tsuno | 350/96.26 |

FOREIGN PATENT DOCUMENTS 0120777 3/1984 European Pat. Off. .
2034916 11/1980 United Kingdom .

OTHER PUBLICATIONS

Journal of Nippon Aerospace Society, vol. 26, No. 290 (Mar. '78) pp. 32–37, K. Kuribayashi et al: "Mechanical Properties of Some Aluminum Alloys at Cryogenic Temperature".

Primary Examiner—William L. Sikes
Assistant Examiner—Akm E. Ullah
Attorney, Agent, or Firm—Oblon, Fisher, Spivak, McClelland, & Maier

[57] ABSTRACT

A fiberscope has a light source and a light guide for leading light emitted from the source onto an object disposed in liquid helium. A transmission system for transmitting the image of the object has an image guide. A body tube is fixed to one end of the image guide and faces the object. Objective lenses are disposed in the body tube to project the image of the object onto the one end face of the image guide. An eyepiece is fixed to the other end of the image guide, through which the image of the object is viewed. The interior of the body tube is kept under vacuum.

19 Claims, 9 Drawing Figures

VERY-LOW-TEMPERATURE FIBERSCOPE

BACKGROUND OF THE INVENTION

The present invention relates to a very-low-temperature fiberscope used in liquefied gas of very low temperature, such as liquefied natural gas, liquefied propane gas, liquid nitrogen, liquid helium, etc.

Some devices kept at very low temperature may often require observation of their surface conditions. Such devices include a superconductive magnet device. The superconductive magnet device generally comprises a cryostat, a superconductive coil housed in the cryostat, and liquid helium for cooling the coil to very low temperature.

In the superconductive magnet device, a quenching phenomenon, such that the superconductive coil is shifted from a superconducting state to a normal conducting state, may present itself from some cause. In this case, energy stored in the superconductive coil needs to be released quickly to protect the coil from burning. Conventionally, therefore, the superconductive coil is connected with a detection system for electrically detecting the quenching phenomenon, an energy recovery circuit being connected to both ends of the superconductive coil when an output is delivered from the detection system. In this arrangement, however, the energy recovery circuit is connected so late that the superconductive coil is very liable to be burned. In order to ensure that the superconductive coil is prevented from being damaged by the quenching phenomenon, therefore, it is to be desired that a symptom of the phenomenon is detected in advance so that the energy recovery circuit can be connected to the superconductive coil immediately on detection of the symptom.

Such a symptom may be perceived by production of air bubbles from the surface region of the coil, or by deformation of the coil itself. The quenching phenomenon takes place when the temperature of a part of the superconductive coil is increased slightly, triggering a sudden increase in the temperature of the entire coil. When the temperature of the coil is increased slightly in the initial stage of the quenching phenomenon, the liquid helium in contact with the surface of the coil is heated to produce air bubbles therein. Accordingly, presentation of the quenching phenomenon can be foreseen by observing the production of air bubbles near the surface of the coil. The quenching phenomenon may also be caused by a distortion of the superconductive coil resulting from some external force. Therefore, development of the quenching phenomenon may be expected when the start of coil deformation is observed. In other words, observation of the surface conditions of the superconductive coil enables us to foresee a subsequent development of the quenching phenomenon.

Such observation of the surface region of the superconductive coil requires an image transmission system be placed in the cryostat so that an image of the superconductive coil can be transmitted externally for observation. A fiberscope may be used as an image transmission system which comprises an image guide consisting of a plurality of optical fibers in a bunch, an objective lens unit attached to one end of the image guide and etc.

When using the fiberscope for the observation, the objective lens unit and part of the image guide are immersed in the liquid helium contained in the cryostat, the helium being of a very low temperature of, for example, about 4.2 K. If the fiberscope used is intended for normal-temperature use, freezing or dew condensation will, possibly, ensue on the end face of the image guide or the surfaces of the objective lenses, constituting a hindrance to satisfactory observation.

SUMMARY OF THE INVENTION

The present invention is contrived in consideration of these circumstances, and is intended to provide a very-low-temperature fiberscope capable of preventing freezing and/or dew condensation on both the end face of the image guide and the surfaces of the objective lenses, thereby permitting satisfactory observation of an object kept at very low temperature.

According to one aspect of the present invention, there is provided a fiberscope which comprises a light source; a light guide, extending from the light source to a position near an object of observation in a very-low-temperature region and adapted to lead light emitted from the light source onto the object; an image guide, having one end located in the vicinity of the object and the other end outside the very-low-temperature region and adapted to lead an image of the object to the outside of the very-low-temperature region; an objective lens unit fixed to the one end of the image guide, the objective lens unit including a body tube extending from the one end of the image guide and at least one objective lens whose one side faces said one end of the image guide and whose other side faces the object to project the image of the object onto said one end face of the image guide, the inside of the body tube being kept under vacuum; and an eyepiece fixed to the other end of the image guide and through which the object is viewed.

According to another aspect of the invention, there is provided a fiberscope which comprises a light source; a light guide, extending from the light source to a position near an object of observation in a very-low-temperature region and adapted to lead light emitted from the light source onto the object; an image guide, having one end located in the vicinity of the object and the other end outside the very-low-temperature region and adapted to lead an image of the object to the outside of the very-low-temperature region; an objective lens unit fixed to the one end of the image guide, the objective lens unit including a body tube extending from the one end of the image guide, at least one objective lens whose one side faces said one end of the image guide and whose other side faces the object to project the image of the object onto the one end face of the image guide, and the inside space of the body tube communicating with the outside thereof; and an eyepiece fixed to the other end of the image guide and through which the object is viewed.

BRIEF DESCRIPTION OF THE DRAWINGS

FIGS. 1 to 6 show a fiberscope according to a first embodiment of the present invention, in which

DETAILED DESCRIPTION OF THE PREFERRED EMBODIMENTS

Preferred embodiments of the present invention will now be described in detail with reference to the accompanying drawings.

Figure 1:
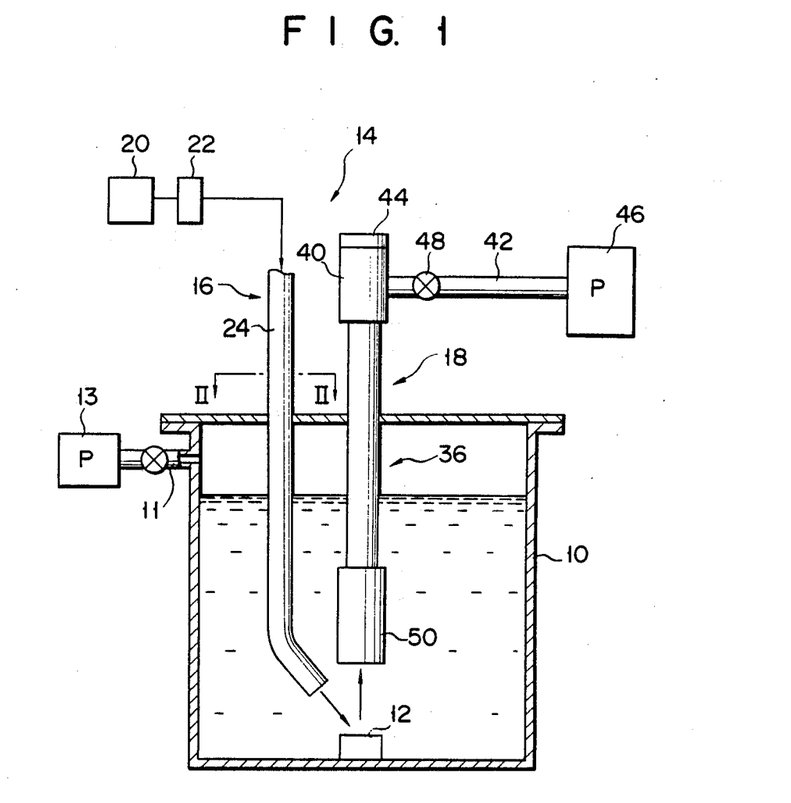
FIG. 1 is a schematic view showing an outline of the fiberscope.

Referring now to FIG. 1, there is shown a fiberscope 14, according to one embodiment of the present invention, used for observation of a object 12, such as a superconductive coil, kept at very low temperature. In FIG. 1, numeral 10 designates a cryostat containing liquid helium therein as a very-low-temperature liquefied gas. The object 12 is held in the cryostat 10. A vacuum pump 13 is connected to the cryostat 10 by means of a pipe 11.

The fiberscope 14 is mainly composed of an irradiation system 16 for irradiating the object 12, and a transmission system 18 for transmitting an image of the object 12.

Figure 2:
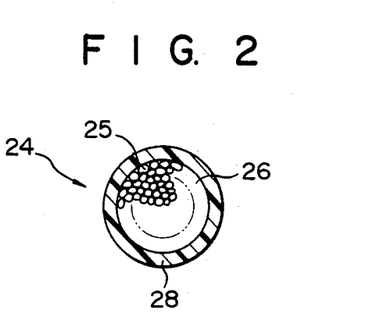
FIG. 2 is a sectional view taken along line II—II of FIG. 1.

The irradiation system 16 includes a light source 20, a filter 22 for intercepting infrared components of light emitted from the light source and a light guide 24 for leading the light transmitted through the filter 22 to the object 12. One end of the light guide 24 is connected to the light source 20 through the filter 22, while the other end thereof extends close to the object 12 through the top wall of the cryostat 10. Thus, the light guide 24 applies the light emitted from the light source 20 to the top surface of the object 12. As shown in FIG. 2, the light guide 24 includes a cylindrical optical fiber bundle 26 consisting of a number of optical fibers 25, and a sheath 28 covering the outer peripheral surface of the fiber bundle 26. The sheath 28 is formed of covering material such as epoxy resin, preferably epoxy acrylate. The thickness of the sheath 28 is set to be one fourth or less of the diameter of the fiber bundle 26.

Figure 3:
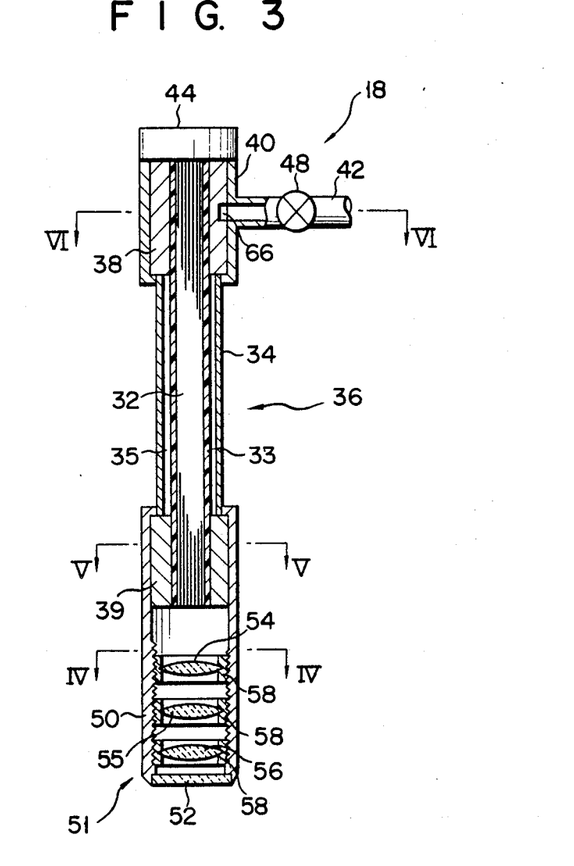
FIG. 3 is a sectional view showing an image guide and an objective lens unit.

As shown in FIGS. 1 and 3, the transmission system 18 is provided with an image guide 36 which includes a cylindrical fiber bundle 32 consisting of a number of optical fibers 30 and a sheath 33 covering the outer peripheral surface of the fiber bundle 32. Like the sheath 28, the sheath 33 is formed of epoxy resin, preferably epoxy acrylate, its thickness being one fourth or less of the diameter of the fiber bundle 32. A flexible covering tube 34 formed of, for example, stainless steel, is disposed outside of the image guide 36, extending coaxial therewith and spaced therefrom. Thus, an annular exhaust passage 35 is defined between the image guide 36 and the covering tube 34. The lower half portion of the image guide 18 extends through the top wall of the cryostat 10 into the liquid helium. Fiber holders 38 and 39 are fixed to the upper and lower end portions of the image guide 36, respectively. These holders 38 and 39 are each in the form of a hollow cylinder having an inner diameter substantially equal to the diameter of the image guide 36. Each end portion of the image guide 36 is fixedly inserted into the bore of its corresponding holder 38 or 39. A connecting tube 40 is hermetically fixed to the outer periphery of the holder 38, and a suction pipe 42 is connected to the connecting tube 40. An eyepiece 44 is fixed to the upper end of the connecting tube 40, facing the top end face of the fiber bundle 32. The upper end of the covering tube 34 is fixed to the lower end of the connecting tube 40. The suction pipe 42 is connected to a vacuum pump 46, and a valve 48 is provided at the middle portion of the suction pipe 42.

An objective lens unit 51, including a body tube 50, is fixed to the fiber holder 39. The fiber holder 39 is inserted into the upper end portion of the body tube 50 and hermetically fixed to the inner peripheral surface of the body tube 50. The lower end of the covering tube 34 is fixed to the upper end of the body tube 50. The lower half portion of the body tube 50 extends from the holder 39 to a position near the object 12. The bottom opening of the body tube 50 is closed by a transparent plate 52 so that the inside of the body tube 50 is kept airtight. First, second and third objective lenses 54, 55 and 56 are arranged within the body tube 50 so as to be coaxial therewith. A pair of semicircular lens holders 58 are fixed to the outer peripheral edge of each objective lens by means of, e.g., an epoxy-based adhesive agent whose adhesiveness will never be diminished even at very low temperatures. Threading is formed on the inner peripheral surface of the body tube 50 so that the lenses 54, 55 and 56, with their corresponding lens holders 58 thereon, are screwed into the body tube 50.

Figure 4:
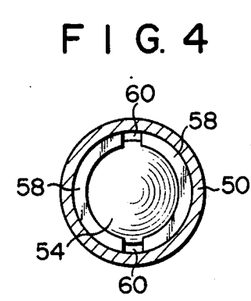
FIGS. 4, 5 and 6 are sectional views taken along lines IV—IV, V—V and VI—VI of FIG. 3, respectively.

As shown in FIG. 4, a pair of communication passages 60 are defined between the lens holders 58. The space between the first lens 54 and the bottom end face of the fiber bundle 32, the space between the first and second lenses 54 and 55, the space between the second and third lenses 55 and 56, and the space between the third lens and transparent plate 52 communicate with one another by means of the communication passages 60.

Figure 5:
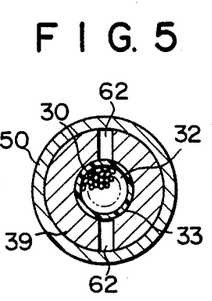
Figure 6:
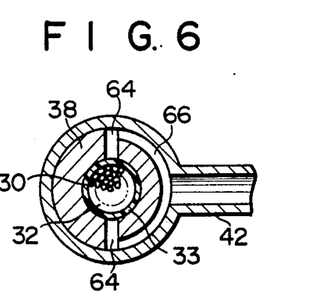

Moreover, as shown in FIG. 5, a pair of communication grooves 62 are formed in the fiber holder 39 to extend in the axial direction of the body tube 50. These communication grooves 62 communicate with the inside space of the body tube 50 and the exhaust passage 35. As shown in FIG. 6, a pair of communication grooves 64 are formed in the fiber holder 38 to extend in the axial direction thereof. These communication grooves 64 communicate with the exhaust passage 35. An annular groove 66 is formed in the holder 38, whereby the two communication grooves 64 are connected to each other. The annular groove 66 communicates with the suction pipe 42. Thus, the vacuum pump 46 can communicate with the inside space of the body tube 50 by means of the suction pipe 42, the annular groove 66, the communication grooves 64, the exhaust passage 35 and the communication grooves 62.

Using the very-low-temperature fiberscope 14 constructed in this manner, the object 12 placed in the liquid helium in the cryostat 10 is observed as follows.

First, the object 12 is placed in the cryostat 10 and the irradiation system 16 and the transmission system 18 of the fiberscope 14 are then set in place, as shown in FIG. 1. Then, the valve 48 is opened and the vacuum pump 46 is actuated to exhaust the interior of the transmission system 18. Hereupon, the inside space of the body tube 50 communicates with the vacuum pump 46 by means of the communication grooves 62, the exhaust passage 35, the communication grooves 64, the annular groove 66, and the suction pipe 42, so that air and steam in the inside space of the body tube 50 is sucked out by the vacuum pump 46, carried on an exhaust current. After the body tube 50 is fully exhausted, the valve 48 is closed. As a result, the inside of the transmission system 18, including that of the body tube 50, is sealed under vacuum.

In manufacturing the transmission system 18, the inside of the system 18 may be sealed after it is exhausted. Alternatively, the valve 48 may be kept open to continue the exhaust from the transmission system 18 till the end of the observation.

After the transmission system 18 is fully exhausted, the cryostat 10 is exhausted and decompressed by the vacuum pump 13. Then, liquid helium is poured into the cryostat 10. Thereafter, the light source 20 is actuated, and a light, with its infrared components intercepted by the filter 22, is applied to the object 12 through the light guide 24. The light reflected by the object 12 is projected through the transparent plate 52 into the body tube 50, imaged by the objective lenses 54, 55 and 56, and then delivered to the eyepiece 44 through the image guide 36.

Thus, behavior of the object 12 at very low temperature can be observed through the eyepiece 44.

The fiberscope 14 with the aforementioned construction has the following advantages.

The inside of the body tube 50 is kept under vacuum, so that no air or steam exists around the objective lenses 54, 55 and 56. Accordingly, even if the body tube 50 is immersed in the liquid helium to be cooled inside, neither freezing nor dew condensation will ensue on the surfaces of the objective lenses, the bottom end face of the fiber bundle 32, or the inner surface of the transparent plate 52. Thus, the object 12 can be clearly observed. If a light containing infrared components is applied to liquid helium, the liquid helium absorbs the infrared components. As a result, a number of air bubbles are produced in the liquid helium, constituting a hindrance to the observation of the object 12. According to this embodiment, however, the infrared components of the light to be projected into the liquid helium are intercepted by the filter 22, so that the condition of the object 12 can be satisfactorily observed without impediment by the production of air bubbles.

The light guide 34 and the image guide 36 have their respective sheaths 28 and 33 formed of epoxy acrylate. This sheath material is higher in refractive index than the quartz used as the material for the optical fibers, thus providing a better contrast. As well, the sheaths 28 and 33 cannot easily peel off, even if they are cooled to very low temperature. Having a thickness equal to one fourth or less of the diameter of their corresponding fiber bundles 26 and 32, the sheaths 28 and 33 are low in contraction coefficient even when they are cooled to very low temperature. If the sheaths 28 and 33 have a greater thickness, they will possibly contract greatly when cooled, bending the optical fibers by their compressive force. In this case, the optical fibers will not be able to securely transmit the light, thereby failing to provide a good contrast. This embodiment offers a solution to this problem.

It is to be understood that the present invention is not limited to the embodiment described above, and that various changes and modifications may be effected therein by one skilled in the art, without departing from the scope or spirit of the invention.

Figures 7, 8:
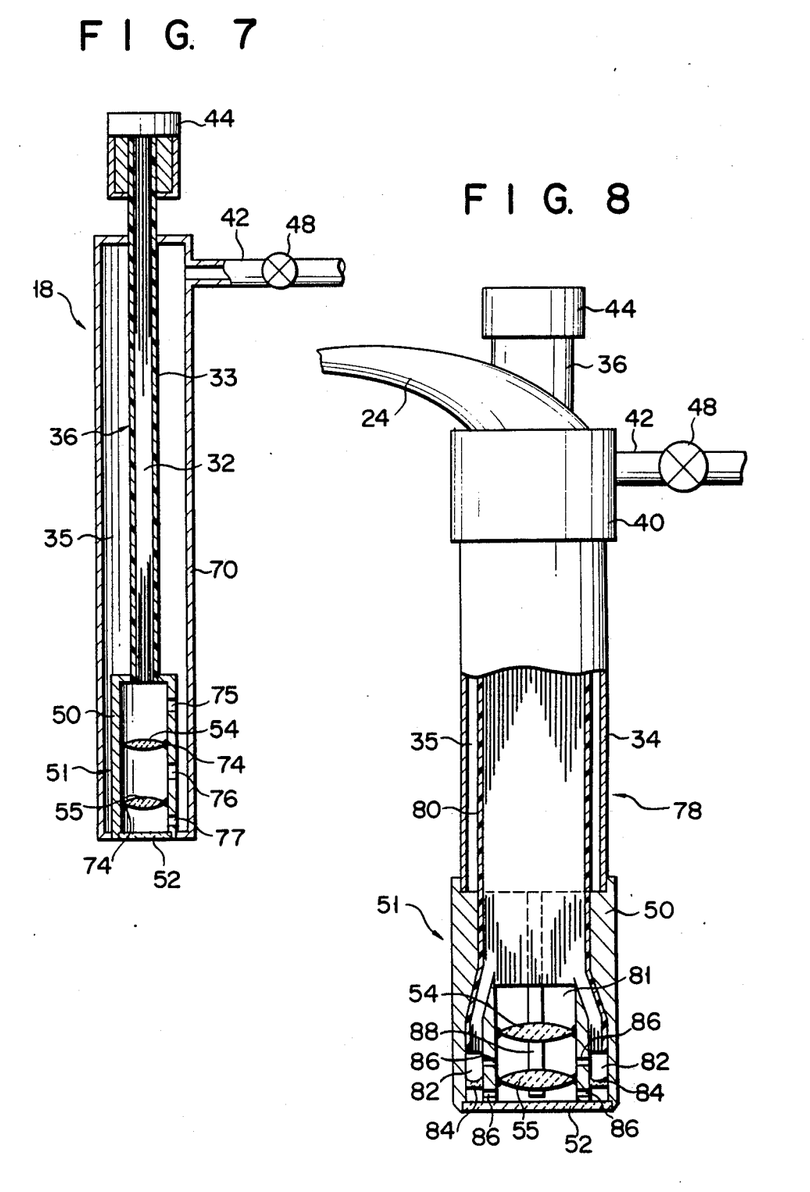
FIG. 7 is a sectional view showing the principal part of a fiberscope according to a second embodiment of the invention.
FIG. 8 is a sectional view showing the principal part of a fiberscope according to a third embodiment of the invention.

For example, the transmission system of the fiberscope may be constructed as shown in FIG. 7. In the following description of this second embodiment, like reference numerals are used to designate like portions as included in the first embodiment.

As shown in FIG. 7, a transmission system 18 includes an image guide 36 which is formed of a fiber bundle 32 and a sheath 33. An eyepiece 44 is fixed to the upper end of the image guide 36, while a body tube 50 is hermetically fixed to the lower end. The bottom opening of the body tube 50 is closed by a transparent plate 52. A pair of objective lenses 54 and 55 are arranged in the body tube 50, facing the bottom end face of the image guide 36 and the transparent plate 42, respectively. An outer tube 70 is disposed outside of the body tube 50 and the image guide 36. One end of the outer tube 70 is fixed to the lower end of the body tube 50, while the other end is fixed to the intermediate portion of the image guide 36. The outer peripheral surfaces of the body tube 50 and image guide 36, together with the inner surface of the outer tube 70, define an annular, airtight exhaust passage 35. The outer tube 70 is connected with a suction pipe 42 which, opening into the exhaust passage 35, is connected to a vacuum pump. The suction pipe 42 is fitted with a valve 48.

In this second embodiment, the objective lenses 54 and 55 are each firmly fixed to the inner peripheral surface of the body tube 50 by means of a soft metal or alloy layer, e.g., an indium layer 74. The following are processes for fixing the objective lenses 54 and 55 to the body tube 50 with the aid of the indium layers 74. First, the indium layers 74, with a thickness of about 0.2 to 0.3 mm, are formed individually on the peripheral edge portions of the objective lenses 54 and 55 by vacuum evaporation. Then, the objective lenses 54 and 55, with their corresponding indium layers 74 thereon, are forcefitted into the body tube 50. Thus, the fixing operation is finished.

Communication ports 75, 76 and 77 are bored through those portions of the peripheral wall of the body tube 50 which are located between the bottom end face of the image guide 36 and the objective lens 54, between the objective lenses 54 and 55, and between the objective lens 55 and the transparent plate 52, respectively. Thus, the inside space of the body tube 50 can communicate with the vacuum pump by means of the communication ports 75, 76 and 77, the exhaust passage 35, and the suction pipe 42.

The fiberscope with the aforementioned construction may provide the same effect as those of the first embodiment. When the transmission system 18 is exhausted by actuating the vacuum pump with the valve 48 open, air and steam in the inside space of the body tube 50 is discharged, carried by an exhaust current, to the outside of the transmission system 18 through the communication ports 75, 76 and 77, the exhaust passage 35 and the suction pipe 42. As a result, the inside of the body tube 50 is kept under vacuum. Thus, as in the first embodiment, there will be no dew condensation or freezing on the surfaces of the objective lenses, the the inner surface of the transparent plate 52, or the bottom end face of the image guide 36.

In the second embodiment, moreover, the objective lenses 54 and 55 are fixed to the body tube 50 by means of the indium layers 74. Indium is an element whose mechanical strength does not change even at a very low temperature of about 4.2 K., it having a thermal expansion coefficient resembling that of the glass which forms the objective lenses. Therefore, even when the transmission system 18 is repeatedly used at normal temperature and at very low temperature, no gaps will be formed between the objective lenses 54 and 55 and the inner surface of the body tube 50. Thus, there will be no possibility of the objective lenses slipping out of the body tube 50, or of the body tube 50 losing its airtight seal.

After the objective lenses 54 and 55, in the second embodiment, are force-fitted into the body tube 50, the whole body tube 50 may be heated to a temperature higher than the melting point (156.4° C.) of indium, e.g., 160° C., kept at that temperature for about one minute, and then cooled. By doing this, the objective lenses 54 and 55 can be soldered to the body tube 50 for greater fixity. Instead of force-fitting the objective lenses into the body tube 50, the objective lenses may be fixed as follows. First, the body tube 50 is heated and the objective lenses, in a cooled state, are then inserted into the body tube 50. Thereafter, the body tube 50 is cooled to fix the objective lenses therein. Alternatively, the body tube 50 may be externally pressurized and crimped to fixedly hold the objective lenses after the objective lenses are inserted into the body tube 50.

The same effect as aforesaid may be obtained through the use of lead, an alloy of lead and tin, or other soft metal, in place of indium.

FIG. 8 shows a fiberscope according to a third embodiment of the present invention, in which irradiation and transmission systems are formed integrally. In FIG. 8, like reference numerals are used to designate like portions as included in the first embodiment.

A light guide 24 and an image guide 36 are formed from a common fiber bundle 78; the central portion of the fiber bundle 78 constitutes the image guide 36 and the outer peripheral portion the light guide 24. The outer peripheral surface of the fiber bundle 78 is covered with a sheath 80 made of epoxy resin. A covering tube 34 made of stainless steel is disposed outside of the fiber bundle 78, and an annular exhaust passage 35 is defined between the covering tube 34 and the fiber bundle 78. A body tube 50 is fixed to the lower end portions of the fiber bundle 78 and the covering tube 34. The body tube 50 has an inner bore 81 and a plurality of vertical holes 82 spaced and arranged outside of the inner bore 81 along the circumference thereof. The bottom openings of the inner bore 81 and the vertical holes 82 are hermetically closed by a transparent plate 52. A plurality of segments of the light guide 24 are individually inserted into the vertical holes 82. As well, a lens 84 for diffusing light is disposed in each of the vertical holes 82 such that it faces the bottom end face of each corresponding light guide segment. The image guide 36 is inserted in the inner bore 81, and a pair of objective lenses 54 and 55 are arranged in the inner bore 81 to face the bottom end face of the image guide 36. Communication ports 86 for connecting the inner bore 81 and the vertical holes 82 are formed in those portions of the wall of the body tube 50 located between the inner bore 81 and the vertical holes 82. The communication ports 86 are located on either side of the lenses 84. An exhaust groove 88 is formed in the inner peripheral surface of the inner bore 81 to extend from the bottom to the top of the body tube 50 along the axial direction thereof. Thus, the inside spaces of the inner bore 81 and the vertical holes 82 can communicate with a vacuum pump by means of the exhaust groove 88, the exhaust passage 35, and a suction pipe 42.

The upper end portion of the fiber bundle 78 is divided into two parts constituting the light guide 24 and the image guide 36. The light guide 24 is connected to a light source through a filter, while an eyepiece 44 is fixed to the upper end of the image guide 36.

In the third embodiment constructed in this manner, the same effect of the first embodiment can be produced by evacuating the inner bore 81 and the vertical holes 82 of the tube 50. According to the third embodiment, moreover, the integral formation of the irradiation and transmission systems leads to a reduction in size and an improvement in the operativity of the fiberscope.

In the first to third embodiments, the body tube is evacuated by means of the vacuum pump. Alternatively, however, the body tube may be exclusively sealed as a vacuum after its manufacture.

Figure 9:
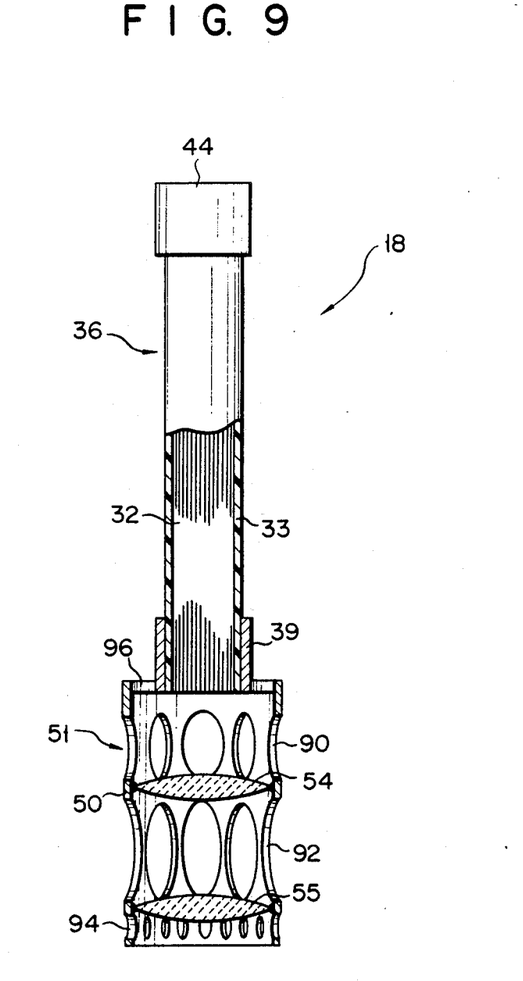
FIG. 9 is a sectional view showing the principal part of a fiberscope according to a fourth embodiment of the invention.

FIG. 9 shows a transmission system of a fiberscope according to a fourth embodiment of the present invention. In this embodiment, the irradiation system is constructed in the same manner as that of the first embodiment.

As shown in FIG. 9, a transmission system 18 is provided with an image guide 36 which includes a fiber bundle 32 and a sheath 33 formed on the outer peripheral surface of the fiber bundle 32. The sheath 33 is formed of epoxy resin such as epoxy acrylate, and has a thickness equal to one fourth or less of the diameter of the fiber bundle 32. An eyepiece 44 is fixed to the upper end of the image guide 36 while a body tube 50 is fixed to the lower end, by means of a holder 39, so as to be coaxial with the image guide 36. A pair of objective lenses 54 and 55 are fixed within the body tube 50, facing the bottom end face of the image guide 36, by means of an epoxy-based adhesive agent. Three sets of apertures 90, 92 and 94 are circumferentially formed in those portions of the outer peripheral wall of the body tube 50 which are located between the bottom end face of the image guide 36 and the objective lens 54, between the two objective lenses 54 and 55, and below the objective lens 55, respectively. A plurality of apertures 96 are circumferentially formed in the top wall of the body tube 50.

In the transmission system 18 with this construction, as in the case of the first embodiment, the body tube side is inserted into a cryostat so that the objective lens 55 faces a sample.

Using the fiberscope constructed in this manner, the sample placed in the cryostat is observed as follows.

First, after the sample is placed in the cryostat, the irradiation system and the transmission system 18 of the fiberscope are set in position in the cryostat. Then, the cryostat is exhausted by a vacuum pump. When the exhaust process ends, helium gas is introduced into the cryostat, following which liquid helium is poured into the cryostat to a predetermined level. Thereupon, part of the liquid helium flows into the body tube 50 through the apertures 90, 92, 94 and 96 therein, finally filling the body tube 50. As a result, air and steam in the body tube 50 are forced out of the body tube by the liquid helium. When the predetermined level is reached, the supply of liquid helium is stopped, and the cryostat is decompressed to a predetermined pressure level by the vacuum pump. By this decompression, air bubbles sticking to the surfaces of the objective lenses 54 and 55 are removed. After the air bubbles are removed, helium gas is introduced into the cryostat to restore the pressure therein to one atmosphere.

After these operations are terminated, the light source is actuated so that observation of the object can be performed through the eyepiece 44. Thus, behavior of the object at a very low temperature can be visually monitored.

According to the fiberscope constructed in this manner, neither air nor steam is present within the body tube or around the objective lenses 54 and 55 during observation. It is, therefore, possible to prevent freezing and/or dew condensation which is usually liable to occur on both the bottom end face of the image guide 36 and the surfaces of the objective lenses 54 and 55 when air or steam is cooled to a very low temperature. Thus, the sample can be satisfactorily observed.

In the fourth embodiment, layers of liquid helium are formed between the bottom end face of the image guide 36 and the objective lens 54, and between the two objective lenses 54 and 55 during the observation of the sample. It is to be understood, therefore, that the distances between the bottom end face of the image guide and the objective lens 54, and between the two objective lenses 54 and 55 should be set in consideration of the refractive index of the liquid helium layers.

What is claimed is:

1. A very-low-temperature fiberscope for observing an object placed in a region at a very low temperature, comprising:
   a light source;
   a light guide extending from the light source to a position near the object in the very-low-temperature region, and adapted to lead light emitted from the light source onto the object;
   an image guide having one end located in the vicinity of the object and the other end outside the very-low-temperature region, and adapted to lead an image of the object to the outside of the very-low-temperature region;
   an objective lens unit fixed to said one end of the image guide, said objective lens unit including a body tube extending from said one end of the image guide and at least one objective lens arranged in the body tube to face said one end of the image guide and the object and adapted to project the image of the object onto said one end of the image guide, including mean for maintaining the interior of said body tube under vacuum; and
   an eyepiece, fixed to the other end of the image guide, through which the image of the object is viewed.

2. The fiberscope according to claim 1, further comprising a covering tube disposed outside the image guide and defining, in cooperation with the outer peripheral surface of the image guide, an exhaust passage extending from the body tube to a position near the eyepiece, and a vacuum pump connected to the exhaust passage, and wherein said objective lens unit includes a communication passage connecting the inside of the body tube and the exhaust passage, and said vacuum pump serving to exhaust the interior of the body tube through the exhaust passage and the communication passage.

3. The fiberscope according to claim 1, wherein said light guide includes a cylindrical fiber bundle consisting of a number of optical fibers and a sheath formed on the outer peripheral surface of the fiber bundle, said sheath being made of an epoxy resin and having a thickness equal to one fourth or less of the diameter of the fiber bundle.

4. The fiberscope according to claim 3, wherein said epoxy resin is epoxy acrylate.

5. The fiberscope according to claim 1, wherein said image guide includes a cylindrical fiber bundle consisting of a number of optical fibers and a sheath formed on the outer peripheral surface of the fiber bundle, said sheath being made of an epoxy resin and having a thickness equal to one fourth or less of the diameter of the fiber bundle.

6. The fiberscope according to claim 5, wherein said epoxy resin is epoxy acrylate.

7. The fiberscope according to claim 1, wherein said objective lens unit includes a transparent plate closing the objecb side opening of the body tube, said transparent plate and said objective lens being fixed to the body tube by means of an epoxy-based adhesive agent.

8. The fiberscope according to claim 1, wherein said objective lens is fixed to the inner surface of the body tube by means of a soft metal layer formed on the peripheral edge of the objective lens.

9. The fiberscope according to claim 8, wherein said soft metal layer is formed of a metal selected from the group consisting of indium, lead, tin, a combination of all, and any two of these three metals.

10. The fiberscope according to claim 1, further comprising a filter disposed between the light source and the light guide and adapted to intercept infrared components of the light emitted from the light source.

11. The fiberscope according to claim 1, wherein said light guide is formed integrally with the image guide.

12. A very-low-temperature fiberscope for observing an object placed in a region at a very low temperature, comprising:
   a light source;
   a light guide extending from the light source to a position near the object in the very-low-temperature region, and adapted to lead light emitted from the light source onto the object;
   an image guide having one end located in the vicinity of the object and the other end outside the very-low-temperature region, and adapted to lead an image of the object to the outside of the very-low-temperature region;
   an objective lens unit fixed to said one end of the image guide, said objective lens unit including a body tube extending from said one end of the image guide and at least one objective lens arranged in the body tube to face said one end of the image guide and the object and adapted to project the image of the object onto said one end of the image guide, the inside space of the body tube communicating with the outside thereof; and
   an eyepiece, fixed to the other end of the image guide, through which the image of the object is viewed.

13. The fiberscope according to claim 12, wherein said body tube has a plurality of apertures circumferentially formed in those portions of the outer peripheral wall thereof which are located between said one end of the image guide and the objective lens, and on the object side with respect to the objective lens.

14. The fiberscope according to claim 12, wherein said light guide includes a cylindrical fiber bundle consisting of a number of optical fibers and a sheath formed on the outer peripheral surface of the fiber bundle, said sheath being made of an epoxy resin and having a thickness equal to one fourth or less of the diameter of the fiber bundle.

15. The fiberscope according to claim 14, wherein said epoxy resin is epoxy acrylate.

16. The fiberscope according to claim 12, wherein said image guide includes a cylindrical fiber bundle consisting of a number of optical fibers and a sheath formed on the outer peripheral surface of the fiber bundle, said sheath being made of an epoxy resin and having a thickness equal to one fourth or less of the diameter of the fiber bundle.

17. The fiberscope according to claim 16, wherein said epoxy resin is epoxy acrylate.

18. The fiberscope according to claim 12, wherein said objective lens is fixed to the inner peripheral surface of the body tube by means of an epoxy-based adhesive agent.

19. The fiberscope according to claim 12, further comprising a filter disposed between the light source and the light guide and adapted to intercept infrared components of the light emitted from the light source.

* * * * *

UNITED STATES PATENT AND TRADEMARK OFFICE
CERTIFICATE OF CORRECTION

PATENT NO. : 4,707,075

DATED : 11-17-87

INVENTOR(S) : Eiji Fukushima; Minoru Tanaka; Kazuo Sanada and Sadao Chigira

It is certified that error appears in the above-identified patent and that said Letters Patent is hereby corrected as shown below:

On the title page

-- Priority information is incorrectly recorded.
   It should read:
   Jul. 31, 1984 [JP] JAPAN..............59-160582--

Signed and Sealed this

Second Day of August, 1988

Attest:

DONALD J. QUIGG

Attesting Officer

Commissioner of Patents and Trademarks